Sept. 22, 1959 M. H. SACHAROW 2,905,422
ATTACHING BRACKET FOR FURNITURE LEGS AND THE LIKE
Filed Feb. 24, 1958
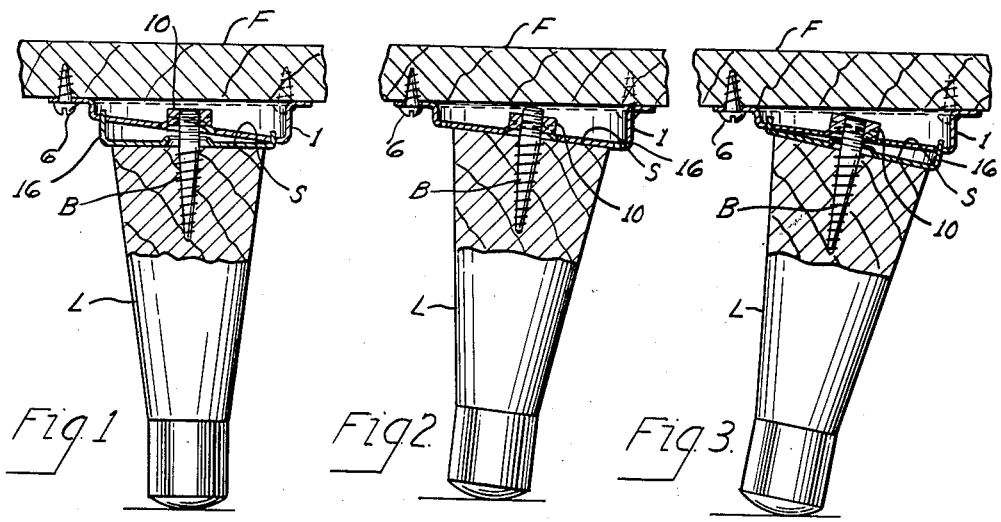
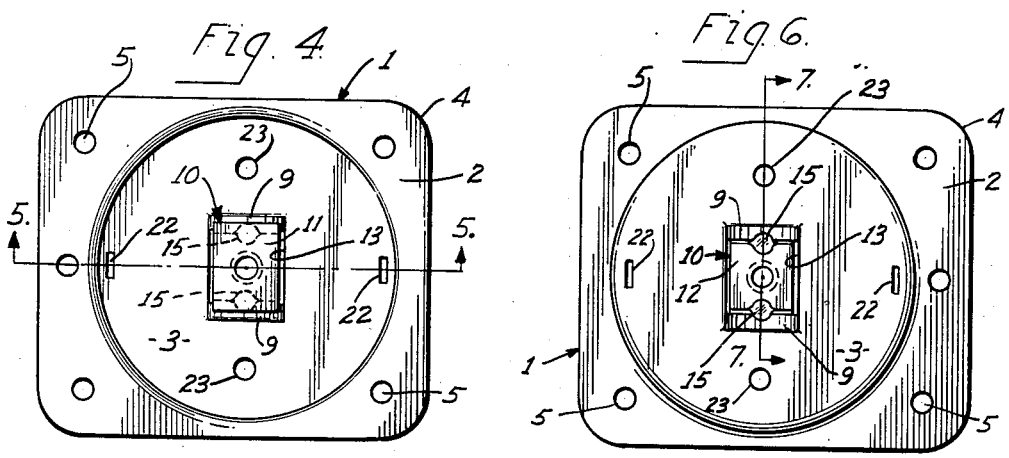
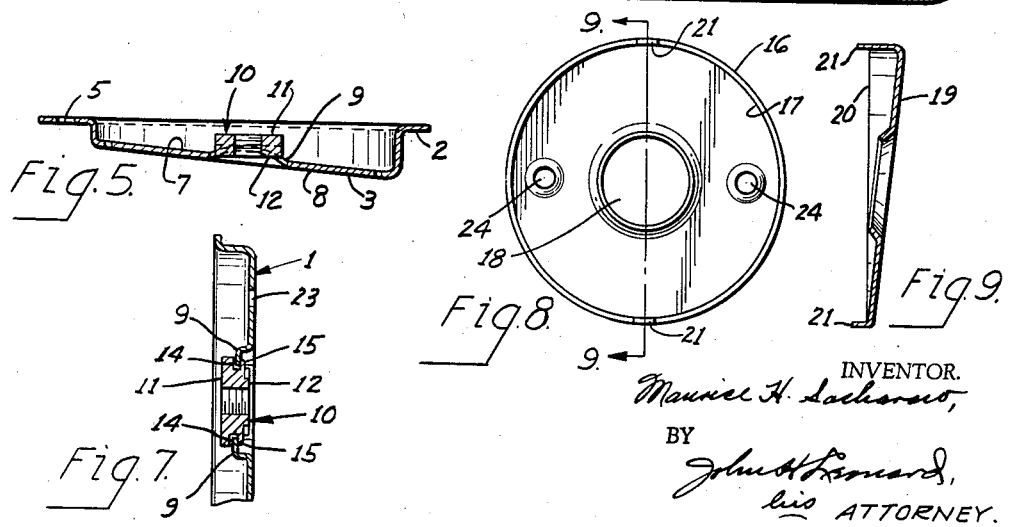
INVENTOR.
Maurice H. Sacharow,
BY
John H. Leonard,
his ATTORNEY.

2,905,422
ATTACHING BRACKET FOR FURNITURE LEGS AND THE LIKE

Maurice H. Sacharow, Cleveland Heights, Ohio

Application February 24, 1958, Serial No. 716,901

3 Claims. (Cl. 248—188)

This invention relates to an attaching device, and particularly to an attaching device for attaching supporting legs and the like to articles of furniture.

The type of furniture leg having at its upper end a bearing surface adapted to bear against a complementary surface on the under side of an article of furniture is well known. Normally such a leg carries a threaded bolt which generally is normal to its bearing surface.

The attaching device commonly used for such a leg is a member having a portion adapted to be secured to the under side or some part of the furniture and another portion having a wall which faces downwardly and of which the lower surface forms a bearing surface adapted to engage the upwardly facing bearing surface of the leg in the normal attached position of the member. The wall providing this downwardly facing bearing surface has a central aperture in which a nut is anchored in fixed position with its axis normal to the bearing surface of the member. The bolt and nut are threadably engaged to draw the complementary bearing surfaces of the leg and member into firm juxtaposition.

The bearing surfaces of the prior attaching member, while facing generally downwardly, is fixed permanently in either of two positions, one so as to be normal to a vertical axis and the other so as to be tilted at a slight angle thereto, so as to dispose the axis of the bolt of the leg either vertically or at a slight angle to the vertical, depending upon the particular attaching member used. Consequently, the furniture manufacturer is required to keep on hand a number of each of these two models of attaching members, some with the bearing surfaces so arranged that they will be horizontal when the members are installed and others with the faces so arranged that they will be on a bias to the horizontal under like conditions. However, there are various objections to this type of attaching device.

In the first place, a different model of member is required for each angular disposition of the leg, thus necessitating a large inventory of members. Generally, about three models satisfy most purposes, that is, one in which the bearing surface is normal to the vertical, one in which the surface is at an angle of a few degrees to the vertical, for instance four or five degrees, and one in which the surface is at about twice the number of degrees to the first angle.

Another objection to this type of attaching device is the fact that if the nut happens to be secured slightly askew, then the bearing surface of the leg will be angularly disposed to the complementary bearing surface on the attaching member and the two cannot be drawn firmly into juxtaposition.

One object of the present invention is to eliminate the disadvantages of this prior structure.

A more general object is to provide a simple and effective attaching device which is adapted for attaching legs, handles, and other parts, to articles of furniture in selected ones of a plurality of different positions.

For purposes of illustration, the invention is described herein specifically as applied to the attachment of legs to furniture, its applicability to attachment of other parts being apparent from the illustrative example. In the specific illustration, the terms "horizontal" and "vertical" apply in their specific sense, but it is to be understood that they are used in the claims merely as reference planes by which the critical relative positions of the parts can be described conveniently, and not necessarily in their absolute or specific sense.

Broadly, the invention resides in the provision of an attaching member which can be attached to the article and which has a bearing surface so positioned that it can be juxtaposed against a complementary bearing surface of a part to be attached with the part disposed in proper position, the member having a connecting element connected thereto for cooperation with a coaxial complementary connecting element on the part, at least one of the elements being mounted for slight rocking movement so that the bearing surfaces can accommodate themselves to each other despite misalignment of either of the elements with respect to the member, or part on which it is mounted. The connecting elements, being thus arranged so that they can rock relative to at least one of the members while connected to each other, can remain in proper coaxial engagement both when the complementary bearing surfaces of the members are in, and when they are out of, parallel relation to each other.

In the exemplary showing of the present invention, the complementary connecting elements are shown as a bolt on the leg and a nut on the member, though the elements could be reversed. The relative rocking is obtained by making the nut rockable relative to the attaching member, the bolt being mounted fixed in position on the leg, instead of by making both the nut and bolt rockable or by making the bolt alone rockable on the leg member, because the installation of the bolt on the leg rigidly in position can be effected much more satisfactorily than can an installation in which the bolt is rockable relative to the member to which it is connected.

In addition to this new structure, the device includes an auxiliary member for changing the angular relation at which the leg is to be disposed. The auxiliary member may be in the form of a washer disposed, or disposable, between the member and leg, and having oppositely disposed surfaces, one of which is arranged to bear against the bearing surface of the attaching member and the other of which is adapted to bear against the bearing surface of the leg. These surfaces of the auxiliary member are oblique with respect to each other, and the washer is of such size that when in proper position, one of its surfaces is juxtaposed against the bearing surface of the connecting member and the other against the bearing surface of the leg.

The bearing surface of the connecting member is arranged on a bias to the horizontal and the angle which it makes to the horizontal is preferably equal to the angle between the two surfaces of the auxiliary member. A passage is provided in the auxiliary member to afford passage of the bolt therethrough for engagement with the nut. Thus, since the bearing surface of the attaching member is on the bias and the bearing surface of the auxiliary member converge with respect to each other, the positioning of the leg can be changed by changing the rotated position of the auxiliary member relative to the attaching member about the axis of the connecting elements. Since the angle between the faces of the auxiliary member and the angle which the bearing surface of the attaching member makes with the horizontal are equal, it is apparent that when in one rotated position of the members about the axis of the connecting elements, the surface of the auxiliary member which is to engage the bearing surface of the leg will be horizontal. In a rotated position 180° from that position, the leg will be supported with its bearing surface engaging the surface which makes an angle to the horizontal equal to twice the angle made by the bearing surface of the attaching member.

Various other objects and advantages will become apparent from the following description wherein reference is made to the drawings showing the preferred embodiment of the invention in which:

Figs. 1, 2, and 3 are front elevations of the device connected to an article of furniture and with a leg installed, showing, respectively, different positions of the leg and article of furniture and the relative positions of the members of the attaching device for obtaining the preselected positions;

Fig. 4 is a top plan view of the attaching member of the device;

Fig. 5 is a cross sectional view taken on the line 5—5 of Fig. 4;

Fig. 6 is a bottom plan view of the member illustrated in Fig. 4;

Fig. 7 is a cross sectional view taken on the line 7—7 in Fig. 6;

Fig. 8 is a top plan view of the auxiliary member of the device; and

Fig. 9 is a cross sectional view taken on line 9—9 of Fig. 8.

Referring to the drawings, the device generally comprises two members which may be used together, or one of which may be used alone. One member comprises an attaching member 1 which has an attaching portion 2, by which it is to be connected to an article of furniture F, and a bearing portion 3.

For convenience and economy in manufacture, the member 1 is shown as a sheet metal stamping in which the attaching means is in the form of a planar peripheral flange 4 in which are apertures 5 through which screws, such as indicated at 6, are passed for fixedly connecting the member to an article of furniture. The central portion of the member is in the form of a shallow dish having a bottom wall 7, the outer surface 8 of which forms a downwardly facing bearing surface when the member is attached to the article of furniture in the operating position. An attaching means is provided on the member 1. This means comprises a fulcrum portion 9 which is aligned with the central part of the bearing surface 8 of the wall 7 and is disposed on the opposite, or inner, face of the wall 7 from the bearing surface 8.

The fulcrum portion 9 is in the form of a boss which is convex away or rearwardly from the surface 8. Carried by the member 1 is a connecting element in the form of a nut 10 having an enlarged head 11 and shank 12 of less width than the head.

The member 1 has an opening 13 which extends through the fulcrum portion 9. The nut 10 is arranged with its shank portion fitting the passage with slight operating clearance and with its head resting upon the margins of the fulcrum 9 at each side of the opening 13, so that the nut is supported on the fulcrum for rocking movement by shoulders 14 at the under side of the head 11.

In order to prevent displacement of the nut from the opening, the shank 12 is peened outwardly at each lateral margin of the passage 13, as indicated at 15, so as to engage the outer surface of the fulcrum portion 9. Thus the nut is loosely supported in place for rocking movement relative to the member 1 by its enlarged head 11 and the peened portions 15.

With such a structure it does not matter that the bolt of the leg to be attached is slightly out of proper alignment relative to the bearing surface of the leg as the nut can rock and accommodate itself slightly so that it and the bolt are coaxial even when the bearing surface 8 and that of the leg are not parallel.

The wall 7 is preferably arranged at such an angle relative to the attaching portion 2 that when the holding portion is connecting the member to the article of furniture in the proper operating position, the bearing surface 8 is disposed so as to face generally downwardly but on a bias to the horizontal, in non-right angular relation to a vertical axis through the nut. Thus, when a leg is secured to the member 1 by means of its bolt cooperating with the nut, the leg will be disposed at an angle to the vertical.

The auxiliary or supplemental part of the attaching device comprises a member 16 which is in the form of a washer having a peripheral flange 17 and a central passage 18. The washer or member 16 is preferably such that it has two bearing surfaces, one the front or outer bearing surface 19 which is adapted to engage the upper bearing surface of the leg and an annular rear or inner bearing surface 20 which is adapted to engage and rest upon the outer bearing surface 8 of the member 1.

The inner bearing surface 20 and the outer bearing surface 19 lie in planes which are oblique to each other, the angle of obliquity preferably being equal to the angle which the surface 8 makes with the horizontal when the member 1 is mounted in proper operating position by its connecting portion 2.

The central opening 18 is arranged so as to be in alignment with, and afford access to, the nut 10, so that the bolt of the leg can extend therepast and engage the nut.

Since the angle of obliquity of the surfaces 19 and 20 is equal to the angle that the surface 8 makes with the horizontal, it is apparent that when the member or washer 16 is juxtaposed on the bearing surface 8 with the greatest spacing between its surfaces 19 and 20 opposite the smallest spacing of the surface 8 from the portion 2, the outer bearing surface 19 is horizontal.

On the other hand, if the member 16 is rotated 180° from this position and juxtaposed on the surface 8, then the point of greatest spacing of the surfaces 19 and 20 is at the point of greatest spacing of the surface 8 from the portion 2, and consequently the surface 18 is disposed at an angle to the horizontal equal to twice the angle of obliquity of the surfaces 19 and 20. On the other hand, if half that angle with the vertical is desired, then the member 16 may be withdrawn and the leg fastened directly to the member 1.

Since the angular position which the bolt of the leg makes with the vertical depends on whether or not the member 16 is used and, if used, in what rotated position it is disposed, it is necessary that the nut be rockable so that it can align itself in coaxial relation with respect to the bolt of the leg in each of the above positions of the leg.

Generally, it would be possible to rotate the washer or member 16 to an infinite number of different positions about the axis of the nut 10 so as to change the angularity of the leg and this may be done if desired. However, it generally happens that the member 16 is either to be omitted, to be placed so as to dispose the leg vertical, or to be placed to dispose the leg at twice the angle to the horizontal of the surface 18. Thus, the member 16 need be placed only in either one of two rotated positions, these positions being 180° apart. For convenience in positioning the member 16 in either of these two rotated positions, and for holding it in position until the leg can be connected, suitable tongues 21 are provided on the member 16, these tongues projecting rearwardly of the member 16. Correspondingly, suitable slots 22, complementary to the tongues 21, are provided in the member 1. The tongues 21 and slots 22 preferably are so arranged that the tongues have to be snap fitted in the slots by yielding slightly normal to their faces and so frictionally bind the member 16 into position on the member 1 when it is installed and prior to the tightening of the leg thereagainst.

Furthermore, in many instances it is desirable to effect a more permanent connection between the member 16 and the member 1 instead of depending upon the bolt of the leg for that purpose. In such an instance, suitable screw holes 23 are provided in the member 1 and aligned holes 24 are provided in the member 16. Thus a single screw can be put through each set of registering or aligned holes in the member 16 and the member 1 and thus secure the members firmly to the article of furniture.

In the form illustrated, the nut is made rockable so that the complementary connecting elements of the member 1 and leg member are connected so that they can rock relative to at least one of the members and thereby remain in coaxial engagement both when the bearing members of the leg and of the member 1 are in parallelism and when they are out of parallelism.

Referring again next to Figs. 1, 2, and 3, the leg L is shown with a bolt B rigidly fixed to the leg and with its axis normal to the bearing surface S on the upper end of the leg. In Fig. 1 the leg is installed with the member 16 turned so that the most widely spaced portions of the faces 19 and 20 are disposed at the portion of the surface 8 which is lowest or farthest from the portion 2 or article of furniture, thus disposing the leg at twice the angle it would be disposed did its bearing surface directly engage the surface 8.

In Fig. 2, the member 16 has been rotated 180° from the position it held in Fig. 1 and therefore, since the angle of obliquity between its surfaces 19 and 20 is equal to the angle which the surface 8 makes with the horizontal, the leg L is disposed with the axis of its bolt B vertical and its surface S horizontal.

In Fig. 3, the auxiliary member 16 has been removed so that the surface S of the leg engages the surface 8, disposing the leg at an angle to the vertical equal to one half of the angle at which the leg in Fig. 1 is disposed to the vertical.

If desired, of course, auxiliary member 16 having different angles may be provided so that, if desired, greater or less angularity of the legs with the under side of the article of furniture can be obtained. However, at least one member 16 should be so arranged that in cooperation with the member 1 it can provide a bearing surface which is horizontal.

It is apparent from the foregoing description that the present structure has a number of advantages. It is simple and effective in operation and provides accurate alignment of the leg in a number of different positions with very few parts.

In the claims, the word "platform" has been used as a term generic to anything to be supported by a member attached to it by the bracket.

Having thus described my invention, I claim:

1. An attaching bracket for supporting a platform and comprising an attachment member having a connecting portion adapted for connection to the platform and having a wall positioned so as to be offset flatwise from the platform when the attaching portion is attached to the platform, said wall having an inner rearwardly facing wall surface and an outer forwardly facing wall surface which provides an exterior bearing surface, said wall having a hole extending therethrough, a nut connected to the member at said inner rearwardly facing wall surface, with its thread axis extending through said hole, for rocking relative to the member transversely of the nut axis and thereby permitting the nut axis to be disposed at a plurality of angles to said exterior bearing surface, an auxiliary member having a pair of oppositely facing bearing surfaces which are oblique relative to each other, said auxiliary member being disposed with one of its bearsurfaces juxtaposed against the exterior bearing surface of the attaching member, and said auxiliary member having a passage aligned with the passage of the attaching member and affording access to the nut axially thereof.

2. The structure according to claim 1, wherein said exterior bearing surface of the attaching member is arranged so as to be oblique to the platform when the attaching portion is connected to the platform.

3. The structure according to claim 2 characterized in that the angle of obliquity between the bearing surfaces of the auxiliary member is substantially the same as the angle of obliquity which the exterior bearing surface of the attaching member makes with the platform when the attaching member is installed in its normal operating position on an article, and in one relative rotated position of the attaching member and auxiliary member about the axis of the nut, their outermost bearing surfaces converge at an angle for disposing the bearing surface of the auxiliary member substantially parallel to the plaform.

References Cited in the file of this patent
UNITED STATES PATENTS

| | | |
|---|---|---|
| 672,303 | Williams | Apr. 16, 1901 |
| 821,572 | Allen | May 22, 1906 |
| 918,665 | Gingrich | Apr. 20, 1908 |
| 1,734,170 | Leffert | Nov. 5, 1929 |
| 2,784,930 | Wernecke | Mar. 12, 1957 |
| 2,809,876 | Huff | Oct. 15, 1957 |
| 2,828,174 | Shapiro | Mar. 25, 1958 |